US009674865B2

(12) United States Patent
Pelletier et al.

(10) Patent No.: US 9,674,865 B2
(45) Date of Patent: Jun. 6, 2017

(54) METHOD AND APPARATUS FOR CONTROL OF UPLINK FEEDBACK INFORMATION IN CONTENTION BASED ACCESS IN WIRELESS COMMUNICATIONS

(75) Inventors: Benoit Pelletier, Roxboro (CA); Christopher R. Cave, Verdun (CA); Diana Pani, Montreal (CA); Rocco DiGirolamo, Laval (CA); Paul Marinier, Brossard (CA); Eldad M. Zeira, Huntington, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 1568 days.

(21) Appl. No.: 12/258,922

(22) Filed: Oct. 27, 2008

(65) Prior Publication Data
US 2009/0143074 A1 Jun. 4, 2009

Related U.S. Application Data

(60) Provisional application No. 60/982,629, filed on Oct. 25, 2007, provisional application No. 61/018,924, (Continued)

(51) Int. Cl.
*H04W 72/12* (2009.01)
*H04W 74/08* (2009.01)
(Continued)

(52) U.S. Cl.
CPC ....... *H04W 72/1284* (2013.01); *H04L 1/0026* (2013.01); *H04L 1/1671* (2013.01);
(Continued)

(58) Field of Classification Search
USPC .................................................. 455/452.2
See application file for complete search history.

(56) References Cited

U.S. PATENT DOCUMENTS 7,089,029 B2 8/2006 Cao et al.
7,898,948 B2 * 3/2011 DiGirolamo et al. ........ 370/230
(Continued)

FOREIGN PATENT DOCUMENTS

CN 1228216 A 9/1999
CN 1647562 A 7/2005
(Continued)

OTHER PUBLICATIONS

Nokia Siemens Networks, Nokia, "HS-DPCCH relation to Enhanced Uplink in CELL_FACH State in FDD," 3GPP TSG-RAN WG1 Meeting #51, R2-080390, (Seville, Spain, Jan. 14-18, 2008).

(Continued)

*Primary Examiner* — Steven Kelley
(74) *Attorney, Agent, or Firm* — Condo Roccia Koptiw LLP

(57) ABSTRACT

A method and apparatus for control of uplink feedback information in contention based wireless communications is disclosed. Uplink feedback information such as a channel quality information and hybrid automatic retransmission request (HARQ) acknowledgement/negative acknowledgement (ACK/NACK) information may be transmitted to the universal terrestrial radio access network (UTRAN) by a wireless transmit/receive unit (WTRU) based on explicit and implicit triggers. Providing more frequent and robust information relating to the channel conditions and HARQ status allows the UTRAN to more efficiently utilize the radio resources for downlink data transmissions.

31 Claims, 4 Drawing Sheets

Related U.S. Application Data filed on Jan. 4, 2008, provisional application No. 61/025,378, filed on Feb. 1, 2008.

(51) Int. Cl.

| H04L 1/16 | (2006.01) |
|---|---|
| H04W 74/04 | (2009.01) |
| H04L 1/00 | (2006.01) |
| H04L 1/18 | (2006.01) |

(52) U.S. Cl.
CPC .......... *H04L 1/1685* (2013.01); *H04L 1/0003* (2013.01); *H04L 1/0009* (2013.01); *H04L 1/1829* (2013.01); *H04W 74/04* (2013.01)

(56) References Cited

U.S. PATENT DOCUMENTS

| 8,005,481 B2* | 8/2011 | Bergstrom et al. ........... 455/450 |
| 8,042,033 B2* | 10/2011 | Karmanenko et al. ....... 714/807 |
| 8,649,263 B2 | 2/2014 | DiGirolamo et al. |
| 9,392,620 B2* | 7/2016 | Baker ............... H04W 74/0866 |
| 2004/0009767 A1 | 1/2004 | Lee et al. |
| 2004/0248605 A1 | 12/2004 | Cao et al. |
| 2005/0009527 A1 | 1/2005 | Sharma |
| 2005/0013263 A1* | 1/2005 | Kim et al. ..................... 370/320 |
| 2005/0047366 A1 | 3/2005 | Ghosh et al. |
| 2005/0213497 A1* | 9/2005 | Cho et al. ..................... 370/208 |
| 2006/0077947 A1* | 4/2006 | Kim et al. ..................... 370/349 |
| 2006/0182065 A1* | 8/2006 | Petrovic et al. .............. 370/332 |
| 2006/0203780 A1* | 9/2006 | Terry ............................ 370/335 |
| 2007/0030828 A1* | 2/2007 | Vimpari et al. .............. 370/335 |
| 2007/0104167 A1* | 5/2007 | Nakamata et al. ........... 370/338 |
| 2007/0171849 A1 | 7/2007 | Zhang et al. |
| 2007/0189236 A1 | 8/2007 | Ranta-aho et al. |
| 2007/0258402 A1* | 11/2007 | Nakamata et al. ........... 370/329 |
| 2008/0013499 A1* | 1/2008 | Ratasuk et al. ............... 370/338 |
| 2008/0014942 A1* | 1/2008 | Umesh et al. ................. 455/436 |
| 2008/0046793 A1* | 2/2008 | Heo et al. ..................... 714/748 |
| 2008/0062932 A1 | 3/2008 | Hwang |
| 2008/0123595 A1* | 5/2008 | Lindheimer et al. ......... 370/331 |
| 2008/0186946 A1* | 8/2008 | Marinier et al. .............. 370/349 |
| 2009/0109912 A1* | 4/2009 | DiGirolamo et al. ........ 370/329 |
| 2009/0109937 A1* | 4/2009 | Cave et al. .................... 370/336 |
| 2009/0135769 A1* | 5/2009 | Sambhwani .......... H04L 5/0053 370/329 |
| 2009/0196230 A1* | 8/2009 | Kim et al. ..................... 370/328 |
| 2009/0268676 A1* | 10/2009 | Wigard et al. ................ 370/329 |
| 2013/0128780 A1 | 5/2013 | Terry et al. |

FOREIGN PATENT DOCUMENTS

| CN | 1653830 A | 8/2005 |
| CN | 101030810 A | 9/2007 |
| CN | 101060682 A | 10/2007 |
| JP | 5228055 B2 | 7/1994 |
| JP | 2005-006314 A | 1/2005 |
| JP | 2010-507978 A | 3/2010 |
| TW | I229985 B | 3/2005 |
| WO | WO 9854859 A1 | 12/1998 |
| WO | WO 2006-071162 A1 | 7/2006 |
| WO | WO 2007-017731 A1 | 2/2007 |
| WO | WO 2007/121667 A1 | 11/2007 |
| WO | 2008/051466 | 5/2008 |
| WO | WO 2009-055804 A2 | 4/2009 |

OTHER PUBLICATIONS

"Enhanced Uplink for CELL_FACH State in FDD," 3GPP TSG-RAN #37 Meeting, RP-070677, (Riga, Latvia, Sep. 11-14, 2007).
Third Generation Partnership Project, Technical Specification Group Radio Access Network; Physical layer procedures (FDD) (Release 7), 3GPP TS 25.214 V.7.6.0 (Sep. 2007).
Third Generation Partnership Project, Technical Specification Group Radio Access Network; Physical layer procedures (FDD) (Release 7), 3GPP TS 25.214 V.7.9.0 (Jun. 2008).
Third Generation Partnership Project, Technical Specification Group Radio Access Network; Enhanced uplink; Overall description; Stage 2 (Release 7), 3GPP TS 25.319 V7.2.0 (Apr. 2007).
Third Generation Partnership Project, Technical Specification Group Radio Access Network; Enhanced uplink; Overall description; Stage 2 (Release 7), 3GPP TS 25.319 V7.3.0 (Oct. 2007).
Third Generation Partnership Project, Technical Specification Group Radio Access Network; Enhanced uplink; Overall description; Stage 2 (Release 7), 3GPP TS 25.319 V7.6.0 (Jun. 2008).
Third Generation Partnership Project, Technical Specification Group Radio Access Network; Enhanced uplink; Overall description; Stage 2 (Release 7), 3GPP TS 25.319 V8.3.0 (Sep. 2008).
"Draft 1 minutes of the 59bis TSG-RAN WG2 meeting,"3GPP TSG-RAN WG2 Meeting #60, R2-075189, (Korea, Nov. 5-9, 2007).
"Draft 1 minutes of the 59bis TSG-RAN WG2 meeting, "3GPP TSG-RAN WG2 Meeting #60, R2-075189, (Korea, Nov. 5-9, 2007).
3rd Generation Partnership Project (3GPP), R2-074165, "Discussion on RACH Enhancements", LG Electronics, 3GPP TSG RAN WG2 #59bis Shanghai, China, Oct. 8-12, 2007, 2 pages.
Ranta-Aho, et al., "HSDPA/HSUPA for UMTS High Speed Radio Access for Mobile Communications", John Wiley & Sons Ltd, Jun. 2006, 260 pages.
3GPP Support Team, "Draft 1 minutes of the 59bis TSG-RAN WG2 meeting," 3GPP TSG-RAN WG2 Meeting #60, R2-075189 (Nov. 5-9, 2007).
Ericsson, "Enhanced Uplink for CELL_FACH," 3GPP TSG-RAN WG1 #50-bis, R1-073954 (Oct. 8-12, 2007).
IPwireless, "CQI reporting and resource allocation for CQI reporting w.r.t. DRX level," 3GPP TSG RAN WG2 #57bis, R2-071419 (Mar. 26-30, 2007).
Nokia Corporation et al., "Introduction of Enhanced Uplink in CELL_FACH in 25.331", Change Request 25.331 CR 3387, rev 1, Current Version 8.3.0, 3GPP TSG-RAN WG2 Meeting #63, R2-084673, (Jeju, Korea, Aug. 18-22, 2008).
Nokia et al., "Enhanced CELL_FACH State with E-DCH," 3GPP TSG-RAN WG1 #50-bis, R1-074300 (Oct. 8-12, 2007).
Nokia et al., "Resource assignment for E-DCH access in CELL_Fach state," 3GPP TSG-RAN WG1 #50-bis, R1-074303 (Oct. 8-12, 2007).
Nokia Siemens Networks et al., "Enhanced Uplink for CELL_FACH State in FDD", TSG-RAN #37 Meeting, RP-070677, (Riga, Latvia, Sep. 11-14, 2007).
Nokia Siemens Networks et al., "HS-DPCCH Relation to Enhanced Uplink in CELL_FACH State", 3GPP-TSG-RAN WG1 Meeting #51bis, R1-080390, (Sevilla, Spain, Jan. 14-18, 2008).
Nsn et al., "Enhanced Random Access with E-DCH," 3GPP TSG-RAN WG2 Meeting #59bis, R2-074010 (Oct. 8-12, 2007).
Qualcomm Europe, "L1/2 aspects for enhanced UL for CELL_FACH," 3GPP TSG-RAN WG1 #50-bis, R1-074126 (Oct. 8-12, 2006).
Samsung, "CQI report and scheduling procedure," 3GPP TSG-RAN WG1 Meeting #42bis, R1-051045 (Oct. 10-14, 2005).
Third Generation Partnership Program Support Team, "Current Minutes of the 59bis TSG-RAN WG-2 Meeting (Shanghai, China Oct. 8-12, 2007)", TSG-RAN WG2 meeting #60, R2-07xxxx, (Korea, Nov. 5-9, 2007).
Third Generation Partnership Project, "Technical Specification Group Radio Access Network; Enhanced Uplink, Overall Description; Stage 2 (Release 7)", 3GPP TS 25.319, V7.2.0, (Mar. 2007).
Third Generation Partnership Project, "Technical Specification Group Radio Access Network; Enhanced Uplink, Overall Description; Stage 2 (Release 7)", 3GPP TS 25.319, V8.3.0, (Sep. 2008).
Third Generation Partnership Project, "Technical Specification Group Radio Access Network; Enhanced Uplink, Overall Description; Stage 2 (Release 7)", 3GPP TS 25.319, V7.3.0, (Sep. 2007).
Third Generation Partnership Project, Technical Specification Group Radio Access Network; Physical layer procedures (FDD) (Release 7), 3GPP TS 25.214, V7.6.0, (Sep. 2007).

(56) References Cited

OTHER PUBLICATIONS

Third Generation Partnership Project, Technical Specification Group Radio Access Network; Physical Layer Procedures (FDD) (Release 7), 3GPP TS 25.214, V7.9.0, (May 2008).

Third Generation Partnership Project, Technical Specification Group Radio Access Network; Physical Layer Procedures (FDD) (Release 7), 3GPP TS 25.214, V8.3.0, (Sep. 2008).

Third Generation Partnership Project, "Technical Specification Group Radio Access Network; Radio Resource Control (RRC); Protocol Specification (Release 8)", 3GPP TS 25.331, V8.0.0 (Sep. 2007).

Third Generation Partnership Project, "Technical Specification Group Radio Access Network; Radio Resource Control (RRC); Protocol Specification (Release 8)", 3GPP TS 25.331, V8.4.0 (Sep. 2007).

Third Generation Partnership Project, "Technical Specification Group Radio Access Network; High Speed Downlink Packet Access (HSDPA); Overall Description; Stage 2 (Release 7)," 3GPP TS 25.308 V7.4.0 (Sep. 2007).

Third Generation Partnership Project, "Technical Specification Group Radio Access Network; High Speed Downlink Packet Access (HSDPA); Overall Description; Stage 2 (Release 6)," 3GPP TS 25.308 V6.4.0 (Mar. 2007).

Third Generation Partnership Project, "Technical Specification Group Radio Access Network; High Speed Downlink Packet Access (HSDPA); Overall Description; Stage 2 (Release 7)," 3GPP TS 25.308 V7.8.0 (Sep. 2008).

Third Generation Partnership Project, "Technical Specification Group Radio Access Network; High Speed Downlink Packet Access (HSDPA); Overall Description; Stage 2 (Release 8)," 3GPP TS 25.308 V8.3.0 (Sep. 2008).

European Telecommunications Standards Institute (ETSI), TS 125 308, V7.4.0, "Universal Mobile Telecommunications System (UMTS); High Speed Downlink Packet Access (HSDPA); Overall description; Stage 2 (3GPP TS 25.308 version 7.4.0 Release 7)", vol. 3-R2, No. V7.4.0, ETSI Standards, LIS, Sophia Antipolis Cedex, France, Oct. 1, 2007, 53 pages.

* cited by examiner

METHOD AND APPARATUS FOR CONTROL OF UPLINK FEEDBACK INFORMATION IN CONTENTION BASED ACCESS IN WIRELESS COMMUNICATIONS

CROSS REFERENCE TO RELATED APPLICATIONS

This application claims the benefit of U.S. provisional application Nos. 60/982,629 filed Oct. 25, 2007, 61/018,924 filed Jan. 4, 2008, and 61/025,378 filed Feb. 1, 2008 which are incorporated by reference as if fully set forth.

FIELD OF INVENTION

This application is related to wireless communications.

BACKGROUND

Enhanced uplink has been introduced as part of the release 6 of the third generation partnership project (3GPP) standards. The enhanced uplink operates on a rate request and grant mechanism. A wireless transmit/receive unit (WTRU) sends a rate request indicating the requested capacity, while a network responds with a rate grant to the rate request. The rate grant is generated by a Node B scheduler. The WTRU and a Node B use a hybrid automatic repeat request (HARQ) mechanism for transmissions over an enhanced dedicated channel (E-DCH).

For enhanced uplink transmission, two uplink physical channels, (E-DCH dedicated physical control channel (E-DPCCH) and an E-DCH dedicated physical data channel (E-DPDCH)), and three downlink physical channels, (E-DCH absolute grant channel (E-AGCH), E-DCH relative grant channel (E-RGCH), and E-DCH HARQ indicator channel (E-HICH)), have been introduced. The Node B may issue both absolute grants and relative grants. Rate grants are signaled in terms of a power ratio. Each WTRU maintains a serving grant that can be converted to a payload size.

WTRUs that make E-DCH transmissions have an E-DCH active set. The E-DCH active set includes all cells for which the WTRU has an established E-DCH radio link. The E-DCH active set is a subset of a dedicated channel (DCH) active set. A distinction is made between those radio links that are part of the E-DCH radio link set (RLS) and those that are not. The former includes radio links that share the same Node B as a serving Node B. Cells for non-serving radio links may only send relative grants in an effort to limit or control the uplink interference.

As part of ongoing evolution of the wideband code division multiple access (WCDMA) standard in 3GPP Release 8, a new work item has been established to incorporate E-DCH concepts for WTRUs in a CELL_FACH state. In Release 7 and earlier, the only uplink mechanism for WTRUs in a CELL_FACH state was a random access channel (RACH). The RACH is based on a slotted-Aloha mechanism with an acquisition indication. Before sending a message on a RACH, a WTRU tries to acquire the channel by sending a short preamble (made up of a randomly selected signature sequence in a randomly selected access slot). The WTRU then listens and waits for an acquisition indication from the universal terrestrial radio access network (UTRAN). If no indication is received, the WTRU ramps up its power and tries again (sending a randomly selected signature sequence in a randomly selected access slot). If an acquisition indication is received, the WTRU has effectively acquired the channel, and may transmit a RACH message part of finite duration. The initial preamble transmit power is established based on an open loop power control, whereas the ramp-up mechanism is used to further fine-tune the transmit power. The RACH message is transmitted at a fixed power offset from the last preamble and is of fixed size. Macro-diversity is not employed and the WTRU has no concept of active set for the RACH.

The new work item attempts to increase the uplink user plane and control plane throughput by assigning dedicated E-DCH resources after the initial WTRU power ramp up, (it is referred to "enhanced Uplink in CELL_FACH state and Idle Mode" or "enhanced RACH"). A WTRU transmits a RACH preamble in order to acquire a channel implementing power ramp-up. Once the RACH preamble is detected, a Node B transmits an acquisition indication (AI). After receiving the AI, the WTRU is assigned with an E-DCH resource for a subsequent E-RACH message transmission. The E-DCH resource assignment may be made either with the AI or with an enhanced set of AIs. The WTRU then transmits an E-RACH message and enters a contention resolution phase. The contention resolution phase is provided to solve potential collision of the E-RACH message. After transmission of all the data in the buffer, explicit indication from UTRAN, radio link failure, post verification failure, or expiry of a timer, the E-DCH resource is released.

A WTRU in a CELL_FACH state may use high speed downlink packet access (HSDPA) in the downlink.

However, this approach currently suffers from several problems. First, the initial transmissions on the high speed downlink channel may not be privy to channel quality information. In 3GPP Release 7, this was partially addressed by having the Node B use the channel quality information carried in an information element (IE), "Measured Results on RACH". This IE is included in a number of layer 3 radio resource control (RRC) messages. In addition, a WTRU in a CELL_PCH state receiving dedicated control or data traffic is triggered to send channel quality information through a layer 3 measurement report upon reception of high speed downlink control traffic, (i.e., high speed shared control channel (HS-SCCH) with the WTRU address). However, as the feedback is sent through RRC signaling, it may be too slow for efficient modulation and coding control of the initial high speed downlink transmission.

Second, the 3GPP Release 7 approach is geared more toward WTRU-initiated control traffic, (for instance a CELL UPDATE). In a typical scenario, the WTRU would tag along channel quality information to the uplink RRC message. The network would then use this information to determine the allowed modulation and transport block size, and then send an RRC network response using the selected parameters. However, there may be some inefficiency if the uplink traffic is user-plane data traffic and does not carry any channel quality information, or is an RRC message that does not carry the IE: "Measured Results on RACH", or if user-plane and control-plane traffic is network-initiated.

In both cases, the network may not have timely channel quality information and it would have to rely on the information received in the last IE: "Measured Results on RACH". This inefficiency is likely to be more prevalent with enhanced RACH, as the network may decide to keep more WTRUs in a CELL_FACH state, for example to deal with asymmetric type applications, such as web browsing. It is likely that these WTRUs are kept in a CELL_FACH state, but that their enhanced RACH resources are released (for instance, after the WTRU has finished its transmission). As a result, any subsequent network-initiated downlink transmissions will not have "up-to-date" channel quality information. This would result in some inefficiency as the network would not be able to maximize the downlink transmission rate. Thus high speed downlink packet access (HSDPA) in a CELL_FACH state would benefit significantly from fast uplink feedback for both channel quality and HARQ feedback.

SUMMARY

A method and apparatus for control of uplink feedback information in contention based wireless communications is disclosed. Uplink feedback information such as a channel quality information and HARQ ACK/NACK information may be transmitted to the UTRAN by a WTRU based on explicit and implicit triggers. By providing more frequent and robust information relating to the channel conditions and HARQ status, the UTRAN can more efficiently utilize the radio resources for downlink data transmissions.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment.

When referred to hereafter, the terminology "Node B" includes but is not limited to a base station, a site controller, an access point (AP), or any other type of interfacing device capable of operating in a wireless environment. When referred to hereafter, the terminology "Enhanced RACH" refers to the use of enhanced uplink (E-DCH) in CELL_FACH state and in an idle mode. The Enhanced RACH transmission may use Release 6 MAC-e/es entities or MAC-i/is entities that are introduced in Release 8 as part of the "Improved Layer 2" feature. The terminologies "MAC-e/es PDU" and "MAC-i/is PDU" include, but are not limited to, the PDUs generated by the MAC-e/es entities, PDUs generated by the MAC-i/is entities, or any PDUs generated by the MAC entity used to perform E-DCH transmission in the CELL_FACH state and an idle mode. When referred to hereafter, the reception of an acquisition indication refers to the allocation of an E-DCH resource to the WTRU via a positive acknowledgement (ACK) on an acquisition indication channel (AICH) or via a negative acknowledgement (NACK) on the AICH followed by an index over an enhanced AICH (E-AICH). When referred to hereafter, the HS-DPCCH information refers to the information required by a WTRU in order to send HS-DPCCH feedback, such as the delta ACK/NACK, delta CQI, CQI feedback cycle, etc.

When referred to hereafter, the terminology "HS-DPCCH resource" refers to the uplink/downlink channels required for support of HS-DPCCH transmission, the uplink scrambling code information, the HS-DPCCH information, etc.

Figure 1:
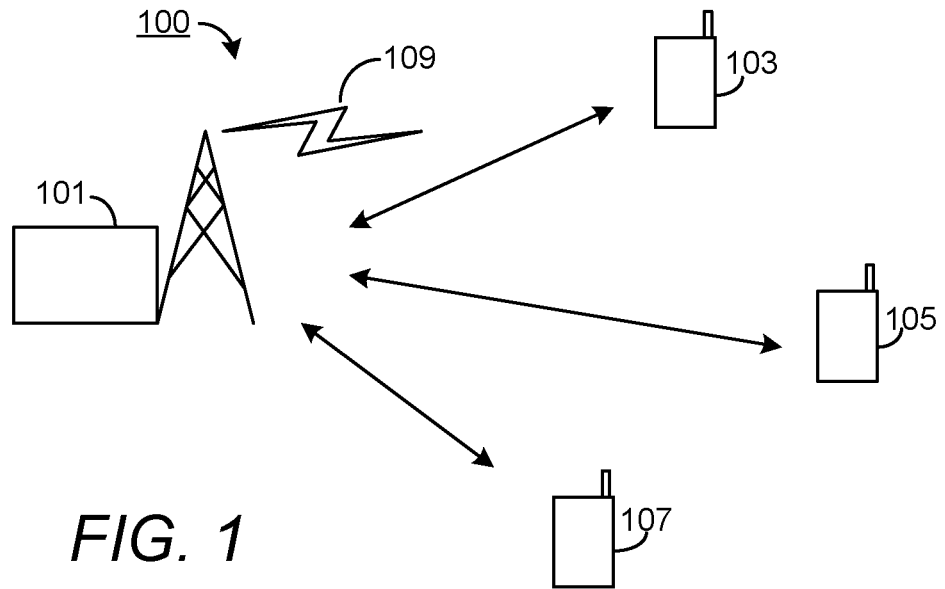
FIG. 1 shows a UTRAN network containing a Node B and multiple WTRUs.

FIG. 1 shows a UTRAN network 100 comprising a Node B 101 and three WTRUs, 103, 105, and 107. The Node B 101 communicates through a wireless link 109 with at least one WTRU 103, 105 and 107. The WTRUs 103, 105 and 107 have receivers for receiving data from the Node B 101 and transmitters for sending information to the Node B 101. The connection 109 where information flows in a direction from the WTRU 103, 105, and 107 to the Node B 101 is called the uplink (UL), while the connection 109 where information flows in a direction from the Node B 101 to the WTRU 103, 105, and 107 is called the downlink (DL).

Figure 2:
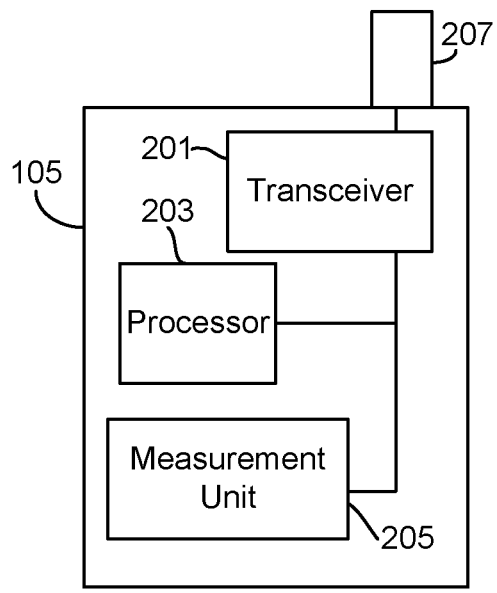
FIG. 2 shows a WTRU configured to report feedback information in the uplink.

FIG. 2 is a block diagram of a WTRU 105 configured to transmit feedback information on the uplink. The WTRU 105 comprises a transceiver 201 that is configured for wireless communications and is capable of receiving transmissions from a Node B 101, or sending transmissions to a Node B 101. Transmission to and from the WTRU 105 are received/transmitted through an antenna 207. The WTRU 105 further comprises a measurement unit 205 configured to measure the channel quality of the current link 109 with the Node B 101. Information relating to the measured quality may be transmitted to the Node B 101 to allow the Node B 101 to regulate its modulation and coding scheme (MCS). A processor 203 controls the measurement unit 205 and the transceiver 201 and controls the reception and transmission of data including the uplink feedback information. The processor 203 may be configured to transmit the uplink feedback information based on an explicit triggering event, or may implicitly transmit the uplink feedback information based on the existence of a predetermined condition.

The transmission of UL feedback information (eg. the channel quality information), for example over the HS-DPCCH, with E-DCH in a WTRU in the CELL_FACH state may be configured by the UTRAN. The determination of when the WTRU transmits the UL feedback information may be classified in two categories, explicit and implicit. The various approaches for both explicit and implicit triggering of UL feedback information transmission may be used individually or in any combination to transmit the UL feedback information.

Figure 3:
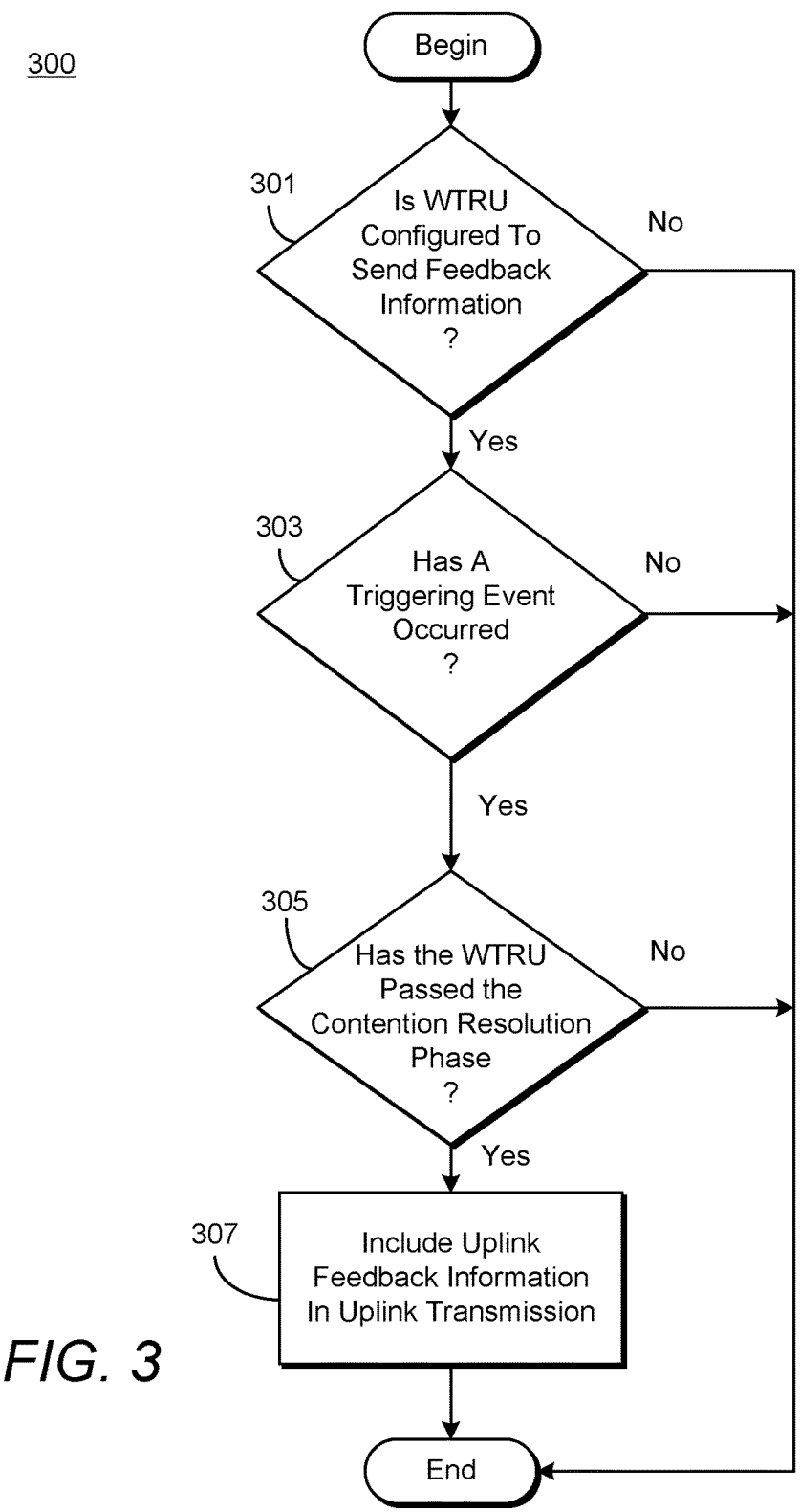
FIG. 3 is a block diagram of a method of reporting feedback information using explicit triggers.

FIG. 3 is a block diagram of a method 300 for explicit uplink feedback signaling. A WTRU is configured to take measurements to determine channel quality based on downlink transmissions. The WTRU may be configured to send feedback information 301. If the WTRU is configured to send feedback information, and the WTRU determines that a triggering event has occurred 303, then a determination is made whether the WTRU assigned contention free access to an E-DCH resource by the network 305. The particular types of triggering events will be explained in greater detail hereinafter. If the WTRU has completed the contention resolution phase and the WTRU has received a RNTI from the Node B, the access is contention free and the UL feedback information is transmitted on the HS-DPCCH 307. If the WTRU is not configured to send feedback information, has not determined that a triggering event has occurred, or does not have contention free access, the method ends and no UL feedback information is transmitted on the UL 307. Between transmissions of the UL feedback information by the WTRU, the WTRU is continuously taking channel quality measurements. When a triggering event occurs, it indicates to the WTRU to transmit the UL feedback information and the WTRU transmits the UL feedback information via the HS-DPCCH 307.

Alternatively, the WTRU only begins taking measurements when a triggering event has occurred. When the trigger event occurs, the WTRU begins taking measurements and then may be configured to transmit the uplink feedback information, CQI, and HARQ ACK/NACK.

When a network initiates a downlink transmission to a WTRU in a CELL_FACH state that has no E-DCH resource, the WTRU may use the downlink transmission as a trigger to send channel quality information. For example, this may occur after initial RRC connection has been established, or after the E-DCH resource has been released for some reason. The WTRU in a CELL_FACH state may use the downlink transmission as an explicit trigger to start an uplink access in order to send fresh channel quality information and/or HARQ feedback for the downlink transmission.

Alternatively, an uplink transmission may be used as an explicit trigger to send the channel quality information over the HS-DPCCH. For uplink transmission, the WTRU is configured to request an E-DCH resource. A list of available E-DCH resources is broadcast from the network in a system information block (SIB) and an index to the list may be provided to the WTRU for E-DCH resource assignment. The assigned E-DCH resource may have a one-to-one mapping to the HS-DPCCH information required for the WTRU to transmit the channel quality information and optionally ACK/NACK feedback via the HS-DPCCH. Alternatively, the network may assign an index to the list that contains the E-DCH resources and the HS-DPCCH information may also be listed as part of the information. In both cases, the HS-DPCCH may also be used to provide HARQ ACK/NACK feedback for information received on the HS-DSCH.

The transmission of the channel quality information and/or HARQ ACK/NACK feedback may be triggered upon reception of an acquisition indication after successful random access ramp-up procedure, or when the WTRU receives a downlink transmission after having received a resource allocation through an acquisition indication. The WTRU may detect the downlink transmission when it receives an HS-SCCH transmission with its address. Additionally, the WTRU may also trigger transmission of the channel quality information when the WTRU has uplink data to transmit in CELL_FACH, CELL_PCH, or URA_PCH.

According to a first embodiment of an explicit trigger, the network may be configured to transmit an HS-SCCH order to enable or disable the transmission of the channel quality information over the HS-DPCCH. The HS-SCCH order may be defined using reserve bits. Alternatively, the HS-SCCH order may be defined reinterpreting existing data fields. Alternatively, an existing HS-SCCH order may be used but a WTRU in the CELL_FACH state may be configured to reinterpret the existing HS-SCCH order.

Upon receiving an indication from the UTRAN to transmit the channel quality information, the WTRU begins transmitting the channel quality information on the HS-DPCCH. Optionally, if dedicated data was received by the WTRU, the ACK/NACK may be transmitted. The channel quality indicator (CQI) Feedback cycle (k) that is configured by the higher level signaling may be used. Alternatively, a pre-defined value valid for WTRUs in CELL_FACH may be used.

According to a second embodiment of an explicit trigger, the UTRAN may be configured to signal a WTRU using the E-AGCH whether to send the channel quality information over the HS-DPCCH. The UTRAN may signal the WTRU using the E-AGCH concurrently with contention resolution. Alternatively, the UTRAN may signal the WTRU using the E-AGCH at a later time. The structure of the AGCH structure may be redesigned for this purpose. Alternatively, the fields in the existing E-AGCH may be reinterpreted for the UTRAN to signal the WTRU for this purpose. For example, the absolute grant field may be reinterpreted to indicate that the WTRU transmit channel quality information over the HS-DPCCH.

According to a third embodiment of an explicit trigger, the UTRAN may be configured to signal a WTRU using the E-DCH acquisition indicator channel (E-AICH) whether to send the channel quality information over the HS-DPCCH. The UTRAN may signal the WTRU along with an E-DCH index sent to the WTRU. For example, a specific signature on the E-AICH may be reserved to carry this 1-bit information. The transmission of the channel quality information may be triggered upon receipt of an acquisition indication after successful random access ramp-up procedure, or when the WTRU receives a downlink transmission after having received a resource allocation through an acquisition indication.

In response to this trigger the WTRU prepares the channel quality information and sends the channel quality information concurrently with the initial uplink transmission. This transmission may include WTRU identity (ID) to help detection of enhanced RACH message collision, and/or initial scheduling information to allow proper rate grant generation for the allocated E-DCH resources. The channel quality information may be encoded and transmitted as a k-bit CQI.

According to a fourth embodiment of an explicit trigger, a layer 1 (L1) signal sent by the network over the HS-SCCH (i.e., an HS-SCCH order, which optionally contains an index) may be used. Alternatively, a new L1 signal may be used. The L1 signal, the HS-SCCH, or the new message may carry an index in the list of E-DCH resources broadcasted over the system information block (SIB), whose entries specify the needed configuration parameters. The L1 signal may provide an index or alternatively it may just provide an indication that DL feedback is required. This may trigger the WTRU to initiate the random access procedure to request E-DCH resources in order to get the required parameters for HS-DPCCH transmission. Once the E-DCH configuration information is provided to the WTRU, the WTRU may establish the initial transmit power and start uplink transmission and/or uplink feedback.

According to a fifth embodiment of an explicit trigger, the UTRAN may be configured to indicate to a WTRU to transmit the channel quality information via the HS-DPCCH by a special IE broadcast as part of the set of E-DCH resources. The indication to the WTRU to transmit the channel quality information may be performed for each E-DCH resource individually. Alternatively, the indication to the WTRU to transmit channel quality information may be based on a block of E-DCH resources. The channel quality information may be provided through RRC signaling from the WTRU to the UTRAN, similar to the conventional mechanism using "Measured Results on RACH" IE. However, transmitting the channel quality information provides a better estimate of channel quality than the conventional measurement reporting through the "Measured Results on RACH" IE including common pilot channel (CPICH) received signal code power (RSCP) or Ec/No.

According to a sixth embodiment of an explicit trigger, the UTRAN may be configured to indicate to a WTRU to transmit the channel quality information over the HS-DP-CCH when the WTRU is assigned contention-free E-RACH resources by the UTRAN. The WTRU is considered to have a contention free resource when the network echoes the WTRU E-RNTI over the E-AGCH before the expiration of a configured timer. Upon reception of this indication the WTRU consider contention resolution phase successful and thus the access is contention free Channel quality information is transmitted along with an initial uplink transmission, (e.g., E-DCH message), after a WTRU has been assigned an enhanced RACH resource. For random access, the WTRU transmits a random access preamble. After detecting the preamble, a Node B transmits an acquisition indication, and selects an E-DCH resource from the common pool of resources and assigns the selected E-DCH resource to the WTRU. The WTRU then transmits E-DCH message using the allocated E-DCH resource along with the channel quality information.

Figure 4:
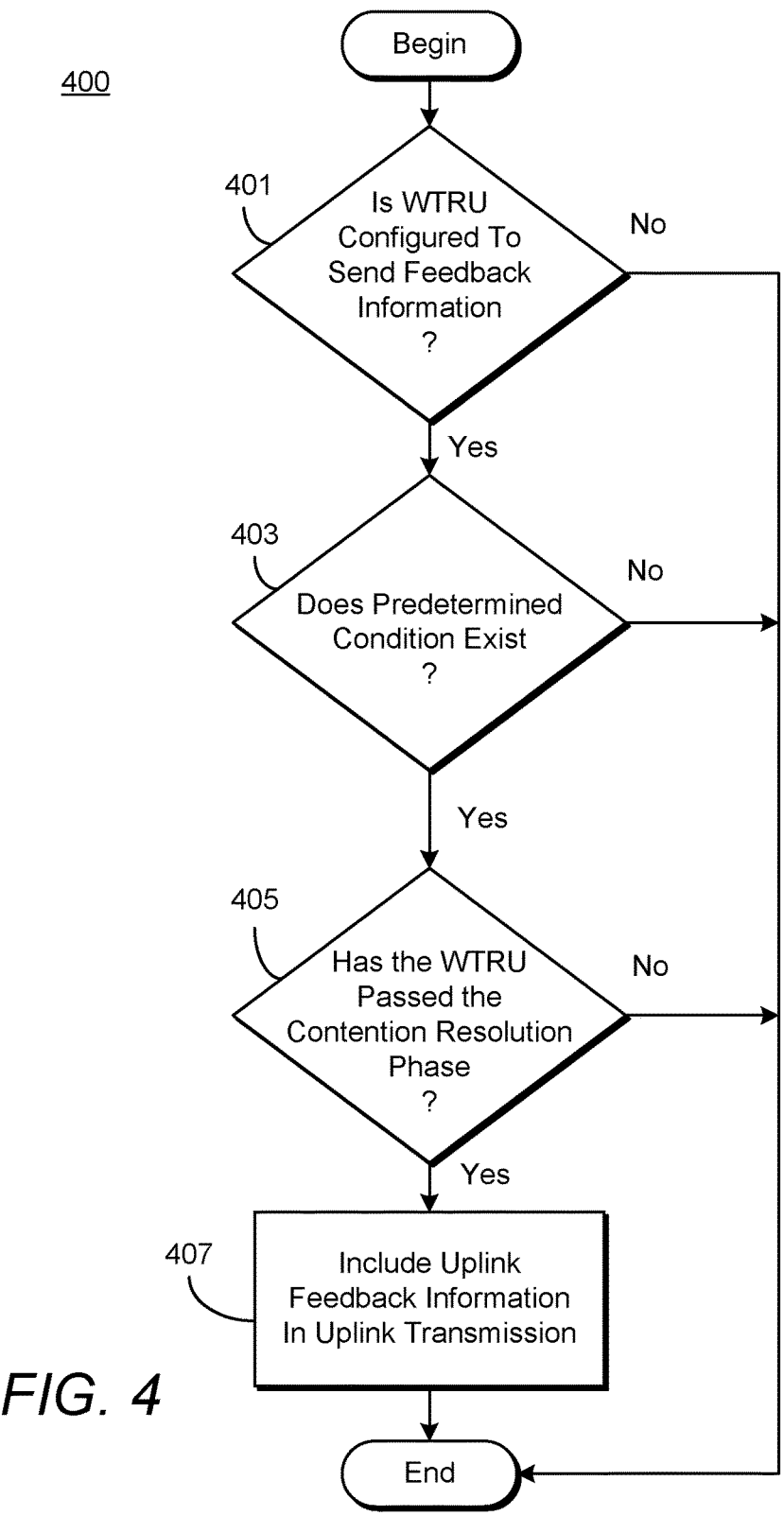
FIG. 4 is a block diagram of a first method of reporting feedback information using implicit triggers.

FIG. 4 is a block diagram of a method 400 of implicit uplink feedback signaling. The WTRU may be configured to send feedback information 401. If the WTRU is configured to send feedback information, and the WTRU determines that a predetermined condition exists 403, then a determination is made whether the WTRU assigned contention free access to an E-DCH resource by the network 405. If the WTRU has completed the contention resolution phase and the WTRU has received a RNTI from the Node B, the access is contention free and the UL feedback information is transmitted on the UL 407. If the WTRU is not configured to send feedback information, has not determined that a predetermined condition exists, or does not have contention free access, the method ends. Between transmissions of the UL feedback information by the WTRU, the WTRU is continuously taking channel quality measurements.

Implicit rules may be defined for the WTRU to determine when to send the UL feedback information on the HS-DPCCH based on predetermined conditions. The rules may be considered individually or in any combination. The rules may also be applied if the channel quality information is appended to a MAC-e or MAC-i PDU.

According to a first embodiment of an implicit trigger, the WTRU may be configured to transmit the channel quality information over the HS-DPCCH based on the logical channel over which data is being sent on the E-RACH. For example, if the WTRU is in CELL_PCH, URA_PCH or Idle Mode state and moves to a CELL_FACH state to transmit data and the data is CCCH data, the WTRU may be configured not to send the channel quality information in the UL. Conversely, if data is being sent on either the dedicated control channel (DCCH) or dedicated traffic channel (DTCH), the WTRU may be configured to transmit the channel quality information reports and/or the ACK/NACK on the HS-DPCCH along with UL data. The decision to transmit the channel quality information on HS-DPCCH may be based on sending data from the DCCH or DTCH logical channel or may be based on any other embodiments described herein.

Figure 5:
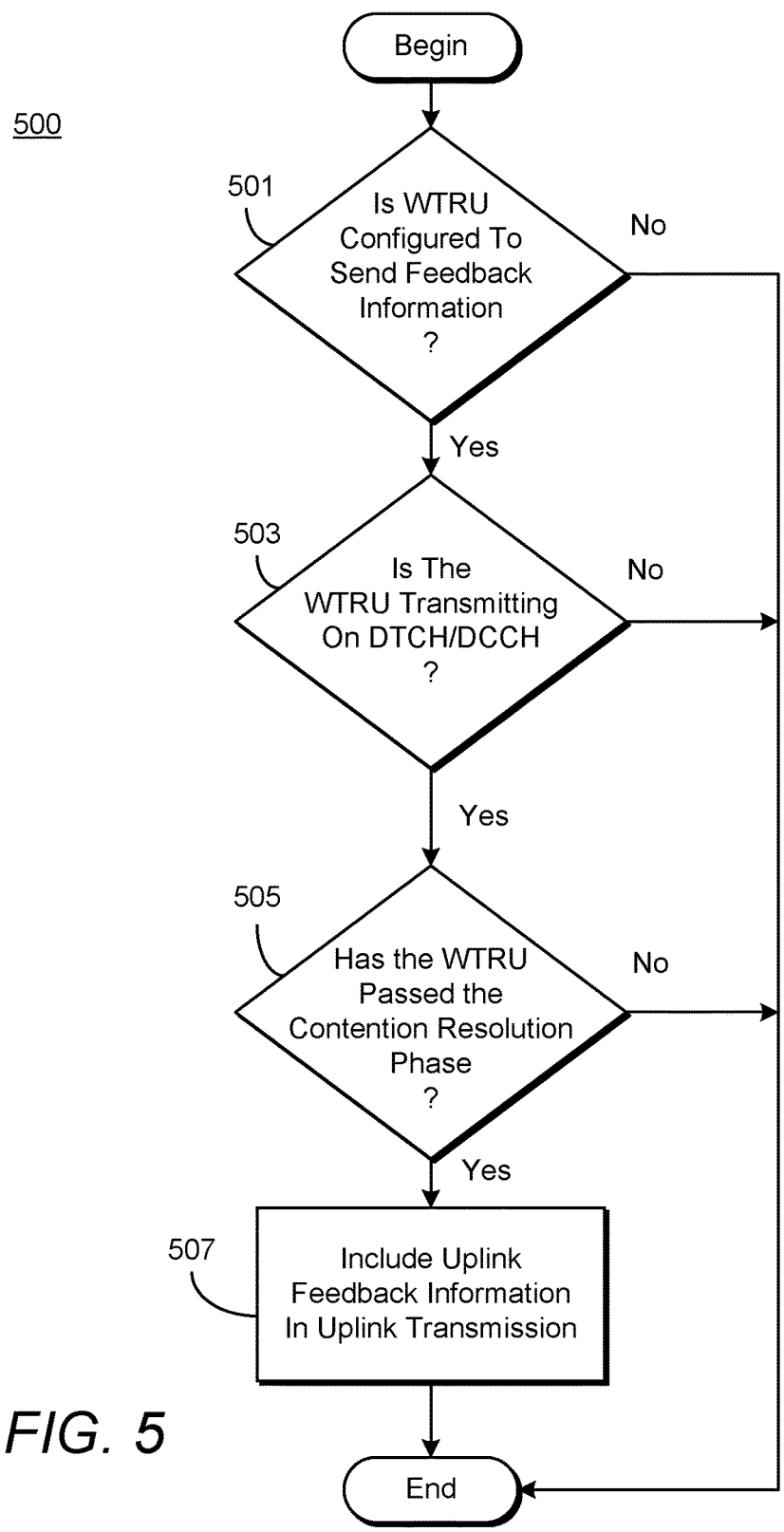
FIG. 5 is a block diagram of a second method of reporting feedback information using implicit triggers.

FIG. 5 is a block diagram of a method 500 of implicit uplink feedback signaling based on the logical channel associated with the data being transmitted. In this example of the first embodiment of an implicit trigger, the logical channel type associated with the transmitted data (e.g.: DCCH or DTCH) acts as a trigger for uplink feedback transmission. The WTRU may be configured to send feedback information 501. If the WTRU is configured to send feedback information, and the WTRU is transmitting on either the DCCH or the DTCH 503, then a determination is made whether the WTRU is assigned contention free access to the DTCH/DCCH by the network 505. If the WTRU has completed the contention resolution phase and the WTRU has received a RNTI from the Node B, the access is contention free and the UL feedback information is transmitted on the UL 507. If the WTRU is not configured to send feedback information, is not transmitting on the DCCH or the DTCH, or does not have contention free access, then the method ends. Between transmissions of the UL feedback information by the WTRU, the WTRU is continuously taking channel quality measurements. When the conditions indicate to the WTRU to transmit the UL feedback information, the WTRU transmits the UL feedback information with the UL data transmission 507.

According to a second embodiment of an implicit trigger, the WTRU is configured to send feedback information while in the CELL_FACH state when the WTRU has an E-DCH resource allocated and the WTRU has successfully decoded its H-RNTI on the downlink (DL) HS-SCCH $X_p$ times over $T_p$ seconds, TTI, or frames. The parameters $X_p$ and $T_p$ may be individually or jointly pre-defined or configured by the network (eg. $X_p$ always has a value of one and time $T_p$ is configured by the network). For example, when a WTRU in a CELL_PCH state has uplink data to transmit or it detects its address (dedicated H-RNTI) in the HS-SCCH, the WTRU sends a layer 3 measurement report with either Ec/No or received signal code power (RSCP) value to update the network as to the channel quality information.

Alternatively, transmission of UL layer 1 (L1) feedback information by the WTRU using E-DCH in CELL_FACH state may be based on one or any combination of the following embodiments:

According to a third embodiment of an implicit trigger, the triggering condition may depend on whether the WTRU has been assigned with a dedicated (H-RNTI) and/or E-DCH radio network temporary identity (E-RNTI) and/or cell radio network temporary identity (C-RNTI). In some cases, the WTRU may not have an E-RNTI and is not allowed to transmit dedicated traffic channel (DTCH)/dedicated control channel (DCCH) transmissions using the Enhanced RACH. In these cases, the WTRU may decide not to initiate an uplink transmission for channel quality information transmission. If the WTRU does not have an H-RNTI and E-RNTI allocated, the WTRU may not send HS-DPCCH feedback even if the WTRU has an allocated E-DCH resource and the required information.

According to a fourth embodiment of an implicit trigger, although the channel quality information may be transmitted at any time regardless of the logical channel, for CCCH transmission, the Node B is not aware of which WTRU is transmitting data. In that case, the WTRU may append a common H-RNTI selected from the broadcast information to the MAC-i or MAC-e PDU. Because the Node B knows that the field normally reserved for the H-RNTI as part of the contention resolution contains the common H-RNTI, if the LCH-ID of the MAC-e or MAC-i PDU indicates CCCH, the channel quality information may then be linked with the common H-RNTI. The channel quality information may then be used when DL data is ready to be transmitted to the WTRU. The common H-RNTI may also be used to detect if collisions have occurred in the Node B.

According to a fifth embodiment of an implicit trigger, the WTRU may be configured to transmit channel quality information over the HS-DPCCH based on the RRC state that the WTRU is in currently, or a state to which the WTRU is transitioning. For example, if the WTRU is in URA_PCH, CELL_PCH or Idle Mode, the WTRU is configured not to send the channel quality information. Alternatively, if the WTRU is in CELL_FACH state, the WTRU is configured to send the channel quality information over the HS-DPCCH.

According to a sixth embodiment of an implicit trigger, the WTRU may be configured to transmit the channel quality information over the HS-DPCCH when the UTRAN sends a buffer status to the WTRU. The buffer status is an indication of the amount of data the UTRAN has to send the WTRU. The WTRU may be configured to transmit the channel quality information if the buffer status indicates that the buffer occupancy exceeds a predetermined threshold. If the buffer occupancy is below the predetermined threshold, the WTRU may alternatively be configured to not send the channel quality information.

According to a seventh embodiment of an implicit trigger, the WTRU may be configured to transmit the channel quality information over the HS-DPCCH based on the LCH-ID of received DL traffic. For example, the WTRU is configured not to send the channel quality information if the LCH-ID indicates that the data corresponds to a signaling radio bearer (SRB) that contains small messages. For example, if the LCH-ID corresponds to a CCCH message, the WTRU may be configured not to send the channel quality information. Alternatively, the WTRU may be configured to transmit the channel quality information when the LCH-ID corresponds to a SRB that contains large messages. If the LCH-ID corresponds to a CCCH message, the WTRU may be configured to optionally not send channel quality information feedback.

In order to provide feedback, given one of the explicit triggers or implicit triggers has been met and the WTRU does not have an ongoing E-DCH transmission, the WTRU may request an E-DCH resource or an HS-DPCCH resource. The request may be done via the enhanced uplink random access procedure, where the WTRU waits for an AICH or an E-AICH to get an E-DCH resource. Where the WTRU requests an E-DCH resource, the WTRU is assigned configuration information for all channels associated with E-DCH transmission, (i.e., dedicated physical control channel (DPCCH), fractional dedicated physical channel (F-DPCH), E-AGCH, E-RGCH, E-HICH, E-DPCCH, and/or E-DPDCH). With the assigned E-DCH resource, the WTRU may send a CQI in the MAC-i/is or MAC-e/es header. Alternatively, HS-DPCCH information may be associated with the assigned E-DCH resource and the WTRU may send a CQI and optionally HARQ ACK/NACK feedback over the associated HS_DPCCH.

In the case where the WTRU requests an HS-DPCCH resource, the WTRU receives the necessary channels to allow HS-DPCCH transmission, including the uplink and downlink control channels for power control, (such as the F-DPCH and the DPCCH, and the required HS-DPCCH information), but excluding one or more of the other E-DCH channels. The HS-DPCCH resource may be part of a separate pool of resources assigned to the WTRU on a per need basis. For example, if the WTRU only needs to send feedback over an HS-DPCCH and has no other uplink traffic, there is no need for the network to waste E-DCH resources and block other WTRUs. Therefore, the network assigns the HS-DPCCH resource index from a separate pool of resources if the WTRU does not have uplink traffic. Both channel quality information and HARQ ACK/NACK feedback may be transmitted over the assigned HS-DPCCH.

The trigger to initiate uplink access to carry channel quality information and/or ACK/NACK feedback may be the reception of a correctly decoded HS-SCCH (HS-SCCH transmission that is masked with the WTRU's HS-DSCH radio network temporary identity (H-RNTI)) and/or reception of data on the associated high speed physical downlink shared channel (HS-PDSCH), or upon reception of a downlink forward access channel (FACH) transmission.

Optionally, if the WTRU has no E-DCH resources, the WTRU in a CELL_FACH state may be configured to periodically start a new uplink transmission in order to send fresh channel quality information. When the WTRU has no uplink data and has not received any downlink transmission, and therefore the triggering conditions of the first and second embodiments are not met, the WTRU may periodically start an uplink transmission for the purpose of sending fresh channel quality information. The channel quality information may be transmitted using any method disclosed above. For example, the channel quality information may be included in MAC-e/es or MAC-i/is header/trailer, on HS-DPCCH associated with E-DCH, on HS-DPCCH without E-DCH transmission.

A WTRU in a cell that supports E-DCH in CELL_FACH and CELL_PCH may not send the layer 3 measurement report when the WTRU in CELL_PCH decodes the dedicated H-RNTI in the HS-SCCH or the WTRU has uplink data to transmit in CELL_PCH, but may send a channel quality information using any of the techniques described above.

For all the embodiments described above, the WTRU may send the channel quality information more frequently for the initial phase. For example, if the WTRU has uplink transmission or decodes the H-RNTI in the HS-SCCH, the WTRU may send channel quality information at a more frequent rate, (i.e., consecutive transmit time intervals (TTIs) or N times faster than the configured rate for normal channel quality information reporting over HS-DPCCH). This will allow the network to optimally adjust the modulation and coding used for the subsequent downlink transmissions. Alternatively, the channel quality information may be sent periodically during the contention resolution phase (frequency of channel quality information reports may be configured to allow for the WTRU to send sufficient channel quality information reports during that phase), periodically for the duration of the RACH access, only if downlink traffic is being transmitted during the RACH access period of the WTRU, or a combination of the above.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method of transmitting uplink feedback information by a wireless transmit/receive unit (WTRU) in a CELL_FACH state comprising:
    the WTRU in the CELL_FACH state, receiving a first information element (IE) from a network indicating whether acknowledgement or negative acknowledgement (ACK/NACK) is supported on a high speed dedicated physical control channel (HS-DPCCH);
    the WTRU in the CELL_FACH state, sending a random access channel (RACH) preamble transmission;
    the WTRU in the CELL_FACH state, in response to the RACH preamble transmission, receiving an allocation from the network for a common enhanced dedicated channel (E-DCH) resource for uplink transmission, wherein the allocation comprises an acquisition indication (AI);
    on a condition that the WTRU transmits dedicated control channel (DCCH) or dedicated traffic channel (DTCH) data and information in the first IE received from the network indicates that ACK/NACK is supported on HS-DPCCH, the WTRU in the CELL_FACH state:
        transmitting an ACK/NACK feedback over the HS-DPCCH using the allocation for the common E-DCH resource, wherein the ACK/NACK is transmitted after a collision resolution;
        determining a channel quality indication (CQI) for a corresponding high speed dedicated shared channel (HS-DSCH); and
        transmitting the CQI in a physical layer on the HS-DPCCH when the common E-DCH resource includes a second IE, wherein the CQI is transmitted after the collision resolution, and wherein the second IE comprises measurement feedback information.

2. The method of claim 1 wherein the ACK/NACK feedback is transmitted according to a configured serving high speed dedicated shared channel (HS-DSCH) radio link.

3. The method of claim 1, wherein the collision resolution resolves potential collisions of one or more common E-DCH transmissions, and confirms that a user equipment can access the common E-DCH resource.

4. The method of claim 1, wherein receiving the allocation from the network for the common E-DCH resource for uplink transmission comprises:
    receiving a system information block (SIB) that includes a list of available E-DCH resources; and
    using an index to determine the common E-DCH resource from the list of available E-DCH resources.

5. The method of claim 1, further comprising the WTRU in the CELL_FACH state, receiving from the network at least one of an E-DCH radio network temporary identifier (E-RNTI), a high speed dedicated shared channel (HS-DSCH) radio network temporary identifier (H-RNTI), or a cell radio network temporary identifier (C-RNTI).

6. The method of claim 1, wherein receiving the allocation from the network for the common E-DCH resource for uplink transmission comprises:
    receiving a signal from a NodeB that includes an index and a list of available E-DCH resources; and
    using the index to determine the common E-DCH resource from the list of available E-DCH resources.

7. The method of claim 1, wherein the AI is an enhanced AI (EAI).

8. The method of claim 1, wherein the second IE comprises one or more of a delta CQI, or a CQI feedback cycle.

9. A method of transmitting uplink feedback information by a wireless transmit/receive unit (WTRU) in a CELL_FACH state comprising:
    the WTRU in the CELL_FACH state, receiving an information element (IE) from a network indicating whether acknowledgement or negative acknowledgement (ACK/NACK) is supported on a high speed dedicated physical control channel (HS-DPCCH);
    the WTRU in the CELL_FACH state, sending a random access channel (RACH) preamble transmission;
    the WTRU in the CELL_FACH state, receiving an allocation from the network for a common enhanced dedicated channel (E-DCH) resource for uplink transmission, wherein the allocation comprises an acquisition indication (AI);
    on a condition that the WTRU transmits dedicated control channel (DCCH) or dedicated traffic channel (DTCH) data and information in the IE indicates that ACK/NACK is supported on HS-DPCCH:
        the WTRU in the CELL_FACH state, determining a channel quality indication (CQI) for a corresponding high speed dedicated shared channel (HS-DSCH); and
        the WTRU in the CELL_FACH state, transmitting the CQI over the HS-DPCCH after a collision resolution when measurement feedback information is provided with the common E-DCH resource.

10. The method of claim 9, wherein the CQI is transmitted according to a configured serving HS-DSCH radio link.

11. The method of claim 9, wherein the collision resolution resolves potential collisions of one or more common E-DCH transmissions, and the collision resolution confirms that a user equipment can access the common E-DCH resource.

12. The method of claim 9, wherein receiving the allocation from the network for the common E-DCH resource for uplink transmission comprises:
    the WTRU in the CELL_FACH state receiving a system information block (SIB) that includes a list of available E-DCH resources; and
    the WTRU in the CELL_FACH state using an index to determine the common E-DCH resource from the list of available E-DCH resources.

13. The method of claim 9, wherein receiving the allocation from the network for the common E-DCH resource for uplink transmission comprises:
    receiving a signal from a NodeB that includes an index and a list of available E-DCH resources; and
    using the index to determine the common E-DCH resource from the list of available E-DCH resources.

14. The method of claim 9, further comprising the WTRU in the CELL_FACH state receiving from the network at least one of a E-DCH radio network temporary identifier (E-RNTI), a high speed dedicated shared channel (HS-DSCH) radio network temporary identifier (H-RNTI), and a cell radio network temporary identifier (C-RNTI).

15. The method of claim 9, wherein the AI is an enhanced AI (EAI).

16. The method of claim 9, wherein the second IE comprises one or more of a delta CQI, or a CQI feedback cycle.

17. A wireless transmit/receive unit (WTRU) in a CELL_FACH state for transmitting uplink feedback information comprising:
a processor configured to:
receive, by the WTRU in the CELL_FACH state, a first information element (IE) from a network indicating whether acknowledgement or negative acknowledgement (ACK/NACK) is supported on a high speed dedicated physical control channel (HS-DPCCH);
send, by the WTRU in the CELL_FACH state, a random access channel (RACH) preamble transmission;
receive, by the WTRU in the CELL_FACH state, in response to the RACH preamble transmission, an allocation from the network for a common enhanced dedicated channel (E-DCH) resource for uplink transmission, wherein the allocation comprises an acquisition indication (AI);
on a condition that the WTRU transmits dedicated control channel (DCCH) or dedicated traffic channel (DTCH) data and information in the first IE received from the network indicates that ACK/NACK is supported on HS-DPCCH:
transmit an ACK/NACK feedback using the allocation for the common E-DCH resource over the HS-DPCCH, wherein the ACK/NACK feedback is transmitted after a collision resolution;
determine a channel quality indication (CQI) for a corresponding high speed dedicated shared channel (HS-DSCH); and
transmit the CQI in a physical layer on the HS-DPCCH when the common E-DCH resource includes a second IE, wherein the CQI is transmitted after the collision resolution, and wherein the second IE comprises measurement feedback information.

18. The WTRU of claim 17, the ACK/NACK feedback is transmitted according to a configured serving high speed dedicated shared channel (HS-DSCH) radio link.

19. The WTRU of claim 17, wherein the collision resolution resolves potential collisions of one or more common E-DCH transmissions, and the collision resolution confirms that a user equipment can access the common E-DCH resource.

20. The WTRU of claim 17, wherein the processor is configured to:
receive, by the WTRU in the CELL_FACH state, a system information block (SIB) that includes a list of available E-DCH resources; and
use, by the WTRU in the CELL_FACH state, an index to determine the common E-DCH resource from the list of available E-DCH resources.

21. The WTRU of claim 17, wherein the processor is further configured to receive, by the WTRU in the CELL_FACH state, from the network at least one of an E-DCH radio network temporary identifier (E-RNTI), a high speed dedicated shared channel (HS-DSCH) radio network temporary identifier (H-RNTI), or a cell radio network temporary identifier (C-RNTI).

22. The WTRU of claim 17, wherein the processor further configured to:
receive a signal from a NodeB that includes an index and a list of available E-DCH resources; and
use the index to determine the common E-DCH resource from the list of available E-DCH resources.

23. The WTRU of claim 17, wherein the AI is an enhanced AI (EAI).

24. A wireless transmit/receive unit (WTRU) in a CELL_FACH state comprising:
a processor, the processor configured to:
receive, by the WTRU in the CELL_FACH state, information from a network an information element (IE) indicating whether acknowledgement or negative acknowledgement (ACK/NACK) is supported on a high speed dedicated physical control channel (HS-DPCCH);
send, by the WTRU in the CELL_FACH state, a random access channel (RACH) preamble transmission;
receive, by the WTRU in the CELL_FACH state an allocation from the network for a common enhanced dedicated channel (E-DCH) resource for uplink transmission, wherein the allocation comprises an acquisition indication (AI); and
on a condition that the WTRU in the CELL_FACH state transmits dedicated control channel (DCCH) or dedicated traffic channel (DTCH) data and information in the IE received from the network indicates that ACK/NACK is supported on HS-DPCCH:
determine, by the WTRU in the CELL_FACH state, a channel quality indication (CQI) for a corresponding downlink HS-DSCH channel, and
transmit, by the WTRU in the CELL_FACH state, the CQI over the HS-DPCCH, after a collision resolution when measurement feedback information is provided with the common E-DCH resource.

25. The WTRU of claim 24, wherein the processor is configured to transmit, by the WTRU in the CELL_FACH state, the CQI over a physical channel according to a configured serving high speed downlink shared channel (HS-DSCH) radio link.

26. The WTRU of claim 24, wherein the collision resolution resolves potential collisions of one or more E-DCH transmissions, and confirms that the WTRU can access the common E-DCH resource.

27. The WTRU of claim 24, wherein the processor is further configured to:
receive, by the WTRU in the CELL_FACH state, a system information block (SIB) that includes a list of available E-DCH resources; and
use, by the WTRU in the CELL_FACH state, an index to determine the common E-DCH resource from the list of available E-DCH resources.

28. The WTRU of claim 24, wherein the processor is further configured to:
receive, by the WTRU in the CELL_FACH state, a signal from a NodeB that includes an index and a list of available E-DCH resources; and
use, by the WTRU in the CELL_FACH state, the index to determine the common E-DCH resource from the list of available E-DCH resources.

29. The WTRU of claim 24, wherein the processor is configured to receive, by the WTRU in the CELL_FACH state, an E-DCH radio network temporary identifier (E-RNTI), a high speed downlink shared channel (HS-DSCH) radio network temporary identifier (H-RNTI), or a cell radio network temporary identifier (C-RNTI).

30. The WTRU of claim 24, wherein the AI is an enhanced AI (EAI).

31. The WTRU of claim 24, wherein the second IE comprises one or more of a delta CQI, or a CQI feedback cycle.

\* \* \* \* \*